US010882366B2

(12) United States Patent
Kuchler

(10) Patent No.: US 10,882,366 B2
(45) Date of Patent: Jan. 5, 2021

(54) ELECTRONIC WHEEL UNIT FOR A VEHICLE WHEEL, AND METHOD FOR OPERATING AN ELECTRONIC WHEEL UNIT OF THIS KIND

(71) Applicant: CONTINENTAL AUTOMOTIVE GMBH, Hannover (DE)

(72) Inventor: Gregor Kuchler

(73) Assignee: Continental Automotive GmbH, Hannover (DE)

( * ) Notice: Subject to any disclaimer, the term of this patent is extended or adjusted under 35 U.S.C. 154(b) by 136 days.

(21) Appl. No.: 16/324,636

(22) PCT Filed: Aug. 10, 2017

(86) PCT No.: PCT/EP2017/070372
§ 371 (c)(1),
(2) Date: Feb. 11, 2019

(87) PCT Pub. No.: WO2018/029320
PCT Pub. Date: Feb. 15, 2018

(65) Prior Publication Data
US 2019/0168550 A1 Jun. 6, 2019

(30) Foreign Application Priority Data
Aug. 10, 2016 (DE) .................. 10 2016 214 865

(51) Int. Cl.
*B60C 23/04* (2006.01)
*B60C 19/00* (2006.01)

(52) U.S. Cl.
CPC ...... *B60C 23/0464* (2013.01); *B60C 23/0416* (2013.01); *B60C 23/0489* (2013.01); *B60C 2019/004* (2013.01)

(58) Field of Classification Search
CPC ............ B60C 23/0464; B60C 23/0416; B60C 23/0489
See application file for complete search history.

(56) References Cited

U.S. PATENT DOCUMENTS 7,253,726 B2 * 8/2007 Okubo ................ B60C 23/0442
340/447
7,817,023 B2 10/2010 Shimura
(Continued)

FOREIGN PATENT DOCUMENTS

CN  102472635 A  5/2012
CN  102666147 A  9/2012
(Continued)

*Primary Examiner* — Faye M Fleming
(74) *Attorney, Agent, or Firm* — Laurence A. Greenberg; Werner H. Stemer; Ralph E. Locher

(57) ABSTRACT

A method for operating an electronic wheel unit disposed on a vehicle wheel of a vehicle includes providing the electronic wheel unit with a detecting device for detecting rotation angle positions of the vehicle wheel that are present at certain detection times, and a radio transmitter device for transmitting a sequence of individual electromagnetic signals which include data representative of the detected rotation angle positions and their associated detection times. The detecting device is further used to detect an amount of a wheel acceleration of the vehicle wheel and to set an interval of time between the detection times of the rotation angle positions to be shorter the greater the amount of wheel acceleration. A corresponding electronic wheel unit and a method and an apparatus for localizing respective installation positions of a plurality of such electronic wheel units on a vehicle are also provided.

10 Claims, 4 Drawing Sheets

(56) References Cited

U.S. PATENT DOCUMENTS

| | | | |
|---|---|---|---|
| 8,130,091 B2 * | 3/2012 | Yu | B60C 23/045 |
| | | | 340/447 |
| 8,332,103 B2 | 12/2012 | Greer et al. | |
| 8,436,724 B2 | 5/2013 | Hannon | |
| 8,576,121 B2 | 11/2013 | Guinart | |
| 8,810,386 B2 * | 8/2014 | Yu | H04W 72/02 |
| | | | 340/445 |
| 9,180,742 B2 | 11/2015 | Kosugi et al. | |
| 9,186,938 B2 * | 11/2015 | Okada | B60C 23/0408 |
| 9,290,068 B2 | 3/2016 | Okada et al. | |
| 9,387,733 B2 | 7/2016 | Fink | |
| 9,539,867 B2 | 1/2017 | Okada et al. | |
| 9,759,557 B2 | 9/2017 | Guinart | |
| 9,902,216 B2 | 2/2018 | Wagner et al. | |
| 10,052,921 B2 | 8/2018 | Bettecken et al. | |
| 10,112,448 B2 * | 10/2018 | Okada | G07C 5/085 |
| 10,166,822 B2 * | 1/2019 | Kosugi | B60C 23/0415 |
| 10,173,479 B2 | 1/2019 | Bettecken et al. | |
| 10,214,060 B2 * | 2/2019 | Okada | B60C 23/0489 |
| 10,220,840 B2 * | 3/2019 | Choi | B60W 10/184 |
| 10,449,810 B2 | 10/2019 | Guinart et al. | |
| 10,710,418 B2 * | 7/2020 | Fischer | B60C 23/0438 |
| 2005/0258953 A1 | 11/2005 | Saitou et al. | |
| 2007/0222571 A1 | 9/2007 | Saitou et al. | |
| 2011/0071737 A1 | 3/2011 | Greer et al. | |
| 2011/0295457 A1 * | 12/2011 | Linda | B60W 40/068 |
| | | | 701/498 |
| 2012/0242502 A1 | 9/2012 | Steiner et al. | |
| 2014/0167950 A1 | 6/2014 | Shima et al. | |
| 2014/0379231 A1 | 12/2014 | Hawes et al. | |
| 2019/0001766 A1 * | 1/2019 | Kuchler | B60R 16/0231 |
| 2019/0329606 A1 * | 10/2019 | Stewart | B60C 23/0489 |

FOREIGN PATENT DOCUMENTS

| | | |
|---|---|---|
| CN | 103476605 A | 12/2013 |
| CN | 103818204 A | 5/2014 |
| CN | 104053562 A | 9/2014 |
| CN | 104210319 A | 12/2014 |
| CN | 104228490 A | 12/2014 |
| CN | 105612067 A | 5/2016 |
| DE | 102004042191 B3 | 2/2006 |
| DE | 102008014537 A1 | 9/2009 |
| DE | 102012204691 A1 | 9/2012 |
| DE | 102009059788 B4 | 3/2014 |
| DE | 102012110689 A1 | 5/2014 |
| DE | 112012005253 T5 | 10/2014 |
| DE | 102014204862 A1 | 9/2015 |
| EP | 1826029 A1 | 8/2007 |
| EP | 2450202 A1 | 5/2012 |
| EP | 2470381 B1 | 6/2013 |
| EP | 2516182 B1 | 10/2013 |
| EP | 3132953 A1 | 2/2017 |
| JP | 2013226862 A | 11/2013 |
| JP | 2014121983 A | 7/2014 |
| JP | 2015074388 A | 4/2015 |
| WO | 2014044355 A1 | 3/2014 |
| WO | 2014198785 A1 | 12/2014 |

* cited by examiner

ELECTRONIC WHEEL UNIT FOR A VEHICLE WHEEL, AND METHOD FOR OPERATING AN ELECTRONIC WHEEL UNIT OF THIS KIND

BACKGROUND OF THE INVENTION

Field of the Invention

The present invention relates to a method for operating an electronic wheel unit and an electronic wheel unit.

Electronic wheel units provided in each case for arrangement on a vehicle wheel of a vehicle are known, for example, from the publications DE 10 2009 059 788 B1, EP 2 470 381 B1, WO 2014/044355 A1 and WO 2014/198785 A1.

For example, in modern motor vehicles, electronic wheel units of this kind that are each arranged on one of the vehicle wheels of the vehicle are often provided that can be used to detect and in particular e.g. monitor predetermined operating parameters, in particular e.g. the tire pressure, of the respective vehicle wheel. A system thus implemented in the vehicle for monitoring (at least) the tire pressure is usually referred to as a tire pressure monitoring system (TPMS).

From the electronic wheel units it is possible to obtain measured values of the operating parameter (s) of the respective vehicle wheel and to transmit them by radio signal to central vehicle electronics. Advantageously, e.g. a driver of the vehicle can thus be informed in the event of an abnormality (e.g. excessively low tire pressure).

In addition, however, the measured values or data transmitted from the electronic wheel units to the vehicle electronics may also be quite generally of great benefit to a large number of vehicle functions based thereon. In addition to the tire pressure monitoring already mentioned, e.g. wheel rotation speed determination, tire contact area determination, wheel load determination and tire tread depth determination may be mentioned, merely by way of example, in this regard.

Electronic wheel units in widespread use are e.g. battery-operated sensor modules, e.g. interchangeably fitted to an inner side of a tire tread of the relevant vehicle wheel, having one or more sensors for measuring the operating parameter (s) to be recorded and having a radio transmitter for radio transmission of signals which include data representative of the measured values of the operating parameters (including the rotation angle position of the vehicle wheel).

The radio signals transmitted by the individual vehicle wheels or the electronic wheel units installed thereon can be received by a central radio receiver arranged in the vehicle and are then available for further use of the data contained therein.

Although the signals transmitted by each electronic wheel unit usually also include an identification code of the respective wheel unit, a practical problem is that the actually existing association between wheel unit or identification code on the one hand and associated installation position on the other hand can be changed e.g. as a result of replacement or refitting of tires or entire vehicle wheels (e.g. by workshop personnel or a user of the vehicle).

Therefore, in addition to the detection and monitoring functionality, localization can be performed, the purpose of which is to associate each electronic wheel unit with the correct installation position in each case, i.e. the installation position of that vehicle wheel on which the wheel unit is actually arranged and installed.

Various localization methods are known from the prior art which can make or, if necessary, update the association between the individual electronic wheel units and the installation positions of the vehicle wheels.

These localization methods are mostly based on the fact that comparing rotation angle position information (for example rotation angle positions and associated detection times) determined by means of detecting means (in the electronic wheel units) that are "wheel-based", i.e. arranged on a respective vehicle wheel, and rotation angle position information determined by means of detecting means that are "vehicle-based", i.e. arranged on the vehicle, (e.g. speed sensors of driver assistance systems such as ABS, ESP etc.) allows a correlation between the determined rotation angle position information to be determined. By analyzing this correlation, an association between the electronic wheel units and the installation positions can then be made.

The detection times of the rotation angle positions may be periodic or an interval of time between these detection times may be set as a function of the vehicle speed or equivalently as a function of the centrifugal acceleration (adjusted by the gravitational component) at the site of the electronic wheel unit (the faster the vehicle travels, the more frequent measurement and transmission tend to be).

These methods for setting the detection times assume that sufficiently large wheel rotation differences (e.g. slippage differences) arise between different vehicle wheels of the vehicle in respective time intervals between successive detection times, which means that each new rotation angle position detection represents a useful acquisition of information for the localization method. The aforementioned dependence of the setting of the detection times on the vehicle speed takes into account that at higher vehicle speeds the tendency is for higher wheel rotation differences, in particular e.g. slippage differences, to be expected over time.

However, it has been found that the determination of a statistically sufficiently meaningful correlation for each electronic wheel unit nevertheless often requires at least approximately 10-50 rotation angle positions to be detected in each case.

Such a high number of required detections or signal transmissions means a high expenditure of time and energy and is detrimental to rapid localization of the electronic wheel units.

Since a localization method that arrives at a result as quickly as possible is sought in practice, the known electronic wheel units normally involve each determined rotation angle position being taken as a basis for immediately generating corresponding data, i.e. data representing this rotation angle position, and transmitting them in the form of a radio signal. The relevant detection time does not have to be explicitly specified in these data, since this time substantially corresponds to the transmission time of the relevant signal. In this case, a delay theoretically existing in practice between the detection time and the transmission time can be taken into account in a suitable manner (as an additive time correction constant).

The known electronic wheel units accordingly normally require initially approximately 10-50 radio signals to be transmitted from each electronic wheel unit to the relevant vehicle device so that this device can determine a statistically meaningful correlation and can analyze it for the purpose of reliable localization of the installation positions of the wheel units.

In this context, a disadvantage of the known localization methods is furthermore that in many countries there are legal provisions which limit the permissible number of radio signals per unit time that may be transmitted by a specific technical device, such as the individual electronic wheel units in this case.

In some countries there is thus e.g. a legally stipulated minimum interval of time between successive signal transmissions by the same transmitter, this interval of time possibly being e.g. 10 s. In this example (at least 10 s interval between signals), if a localization method taking place under ideal conditions requires e.g. 10 radio signals, this means that it normally requires a period of at least 10×10 s=100 s before the installation position of the relevant electronic wheel unit can be associated by the localization method.

SUMMARY OF THE INVENTION

It is an object of the present invention to provide an electronic wheel unit and a method for operating an electronic wheel unit of this kind which allow a localization method that can be completed more quickly.

This object is achieved according to the invention by an operating method and an electronic wheel unit as well as advantageous developments of the invention and e.g. an advantageous localization method and an advantageous localization apparatus, respectively.

A first aspect of the invention relates to a method for operating an electronic wheel unit arranged on a vehicle wheel of a vehicle, wherein the electronic wheel unit comprises detecting means for detecting rotation angle positions of the vehicle wheel that are present at certain detection times and radio transmitter means for transmitting a sequence of individual electromagnetic signals which include data representative of the detected rotation angle positions and their associated detection times. The detecting means are further used to detect an amount of a wheel acceleration of the vehicle wheel and an interval of time between the detection times of the rotation angle positions is set by the detecting means to be shorter the greater the amount of wheel acceleration.

Another aspect of the invention relates to an electronic wheel unit for arrangement on a vehicle wheel of a vehicle, comprising detecting means for detecting rotation angle positions of the vehicle wheel that are present at certain detection times and radio transmitter means for transmitting a sequence of individual electromagnetic signals which include data representative of the detected rotation angle positions and their associated detection times. The detecting means are further designed to detect an amount of a wheel acceleration and to set an interval of time between the detection times of the rotation angle positions to be shorter the greater the amount of wheel acceleration.

The basic idea of the invention is to specify the detection times of the rotation angle positions in such a way that detections that are as useful as possible for the localization method can thus be effected. In particular, each electronic wheel unit can implement e.g. a mathematical model of vehicle dynamics that estimates the evolution of wheel rotation differences (e.g. slippage) on the basis of the detected wheel acceleration and e.g. triggers a measurement of the rotation angle position when a threshold value is reached.

The invention advantageously allows detections of the rotation angle position to be effected purposefully e.g. whenever a data contribution that is useful for the evaluation (in the localization method) appears possible. Advantageously, unnecessary or disturbing radio transmissions and accompanying energy or e.g. battery consumption can be avoided. The localization time is shortened when the proportion of usable transmissions increases.

The term "wheel acceleration" within the context of the invention denotes an overall acceleration (translational acceleration) that is present for the relevant vehicle wheel relative to the driving environment (the ground), said acceleration therefore then having a value other than zero if the vehicle wheel as a whole or the center of mass thereof undergoes an acceleration relative to the ground (inertial system). In this respect, neither the wheel rotation about the wheel rotation axis that results from a rolling process nor a wheel rotation caused by any steering rotational movements (in the case of a steered vehicle wheel) as such results in a wheel acceleration within the context of the invention. Rather, even in the case of a moving vehicle, a non-zero wheel acceleration arises only when the speed of the entire wheel or of the wheel mass center referenced to the ground changes over time. Therefore, for a vehicle traveling straight on a flat road at a constant speed, the wheel accelerations of the vehicle wheels are zero. During cornering and (positive or negative) acceleration processes of the vehicle, on the other hand, such a wheel acceleration (in the wheel transverse direction or the wheel rolling direction) is obtained.

In one embodiment of the invention, there is provision for the interval of time to fall monotonously, in particular e.g. strictly monotonously, as the amount of wheel acceleration (expressed mathematically) increases.

The term "amount" in this context denotes either the value of the wheel acceleration or a value derived therefrom, which increases as wheel acceleration increases and in this context is also a measure of this acceleration.

In a further embodiment of the invention, there is provision for the amount of wheel acceleration to take into account a longitudinal wheel acceleration (in the rolling direction) and/or a transverse wheel acceleration (transverse to the rolling direction).

In this respect, the amount of wheel acceleration may be e.g. in particular the value of the longitudinal wheel acceleration (synonymous with a longitudinal vehicle acceleration in the case of an unsteered vehicle wheel) or the value of the transverse wheel acceleration (synonymous with a transverse vehicle acceleration in the case of an unsteered vehicle wheel). In addition, the amount of wheel acceleration can e.g. also be represented by a mathematical combination containing the amounts of longitudinal wheel acceleration and transverse wheel acceleration.

In one embodiment of the invention, there is provision for the amount of wheel acceleration to be detected periodically, e.g. with a period in the range from 2 s to 6 s.

In another embodiment, there is provision for the amount of wheel acceleration to be detected at times that are set variably by means of the detecting means.

For this purpose, there may be provision for these times to be set e.g. as a function of one or more variables which are detected by means of the detecting means in the region of the relevant vehicle wheel. For example, there may be provision for an interval of time between the detections of the amount of acceleration to be set as a function of a wheel rotation speed of the relevant vehicle wheel and/or as a function of the centrifugal acceleration at the site of the electronic wheel unit.

For all variants, it is normally preferred for the amount of wheel acceleration to be detected at intervals of time ranging from 1 s to 10 s.

In one development of the operating method according to the invention, there is provision for the signals to each include data representing at least three of the detected rotation angle positions and their associated detection times. In a corresponding development of the electronic wheel unit, there is provision for the signals to each include data representing at least three of the detected rotation angle positions and their associated detection times. The number of rotation angle positions and associated detection times represented by the data of a signal may be fixed or can vary from signal to signal. In particular, the data of a signal can represent e.g. at least 4 or e.g. at least 5 of the detected rotation angle positions and their associated detection times. On the other hand, it is usually advantageous if the data of a signal represent e.g. no more than 100, in particular no more than 50 of the detected rotation angle positions and their associated detection times. The basic idea of this development is that initially at least three (or even more) rotation angle positions are accumulated or buffer-stored (by the relevant electronic wheel unit) together with their associated detection times for a respective one of the vehicle wheels in wheel-based fashion, so as then to represent this large amount of rotation angle position information, obtained independently of one another, by means of data transmitted using a single radio signal. For the above-explained example of a legally required minimum interval of time between signals of 10 s and a number of e.g. 10, required for statistical reasons, pieces of rotation angle position information, it is e.g. initially possible for a certain number, e.g. 10, of rotation angle positions to be detected and buffer-stored together with their associated 10 detection times, so as then to transmit this information by means of only a single radio signal. Fewer radio signals to be transmitted are then required before the localization method can associate the installation position with the relevant electronic wheel unit. Advantageously, this development therefore contributes to further increasing the speed of localization. Another advantage of the development, regardless of the ability to increase the localization speed, is that the frequency of transmission can be reduced, which in turn means that e.g. the probability of the occurrence of radio collisions (for multiple stations) and e.g. the energy consumption of the radio transmitter means can be advantageously reduced.

In a further embodiment, there is provision for the number of pieces of rotation angle position information represented by the data of a signal (each consisting of a rotation angle position and the associated detection time) to be selected as a function of a current rotation angle velocity of the relevant vehicle wheel. In particular, this number can be selected to increase for greater rotation angle velocities of the vehicle wheel.

According to one embodiment of the invention, the individual detection times of the rotation angle positions are provided at times at which the relevant vehicle wheel has a predetermined rotation angle position. This rotation angle position can be selected e.g. so that the occurrence thereof is detectable particularly precisely on the basis of the specific detection method.

In a development of the invention, the interval of time between the detection times of the rotation angle positions is further set by the detecting means to be shorter the greater a current rotation angle velocity of the relevant vehicle wheel. This development combines the idea of a detection rate dependent on the rotation angle velocity with the idea of a detection rate varying with the amount of a wheel acceleration.

It is generally preferred for an interval of time between successive detection times to be at least as long as the period during which the vehicle wheel performs more than one, in particular more than two, full (360°) revolutions. On the other hand, it is normally advantageous if this interval of time is at most as long as a period during which the vehicle wheel performs fewer than 20, in particular fewer than 10, full revolutions.

A time difference between successive detection times can quite generally be e.g. advantageously in a range from 0.1 to 30 s, in particular 0.1 to 20 s.

When using a plurality of electronic wheel units for a localization method provided within the scope of the invention, each individual electronic wheel unit can be operated or designed in each case as already described here for "one/the wheel unit".

The transmission of the signals can be effected e.g. substantially periodically (e.g. with periodically successive start times and/or periodically successive end times of the signals). A corresponding time difference (e.g. between successive start times or successive end times) may be e.g. firmly set and e.g. in a range from 1 s to 40 s, more preferably 5 s to 20 s.

Alternatively or additionally, the time difference between successive start times (or successive end times) may be chosen to be variable, in particular so that this time difference decreases as the rotation angle velocity of the relevant vehicle wheel increases. With a variable time difference, this time difference is preferably coded in the data of the signals. In this regard, there may e.g. be provision for the data of a signal to further represent information about the time difference relative to the previous and/or the subsequent signal. In this case, this information can be decoded at the vehicle and taken into account in the evaluation of the signals.

The detecting means of the electronic wheel unit can have e.g. an acceleration sensor (alternatively e.g. a shock sensor, a strain sensor etc.) by means of which the rotation angle positions of the relevant vehicle wheel are detected during driving at the relevant detection times. Furthermore, the detecting means can have e.g. a program-controlled evaluation device for evaluating the (at least one) sensor signal of the sensor(s). Such an evaluation device (e.g. a microcontroller) can take such sensor signals as a basis for generating the data which are transmitted to the radio transmitter means for transmitting the corresponding signals. Finally, the evaluation device can also be used to set the detection times of the rotation angle positions.

The aforementioned acceleration sensor of the detecting means may e.g. be designed to measure a radial acceleration (centrifugal acceleration) at the site of the electronic wheel unit. The sensor signal can be evaluated in a simple manner in this case, in particular for determining the wheel rotation speed (and/or the translational wheel speed). In addition, the same sensor signal can thus be used within the scope of the invention in a simple manner for determining the already mentioned longitudinal wheel acceleration (the longitudinal wheel acceleration is the rate of change of the translational wheel speed over time in the rolling direction).

Alternatively or additionally, the detecting means can also comprise an acceleration sensor which supplies a sensor signal representative of the tangential acceleration at the site of the electronic wheel unit. Even such a sensor signal can be evaluated in a simple manner for determining the longitudinal wheel speed and/or the longitudinal wheel acceleration.

Furthermore, in particular if there is provision within the scope of the invention for an amount of wheel acceleration which takes account of the transverse wheel acceleration, the detecting means can have an acceleration sensor for measuring precisely this transverse wheel acceleration.

Depending on the primary intended use of the relevant electronic wheel unit (e.g. for tire pressure monitoring), the detecting means can of course alternatively or additionally comprise one or more sensors for measuring other wheel operating parameters (e.g. tire pressure, tire temperature etc.).

The radio transmitter means of the electronic wheel unit can provide e.g. a carrier frequency of on the one hand at least 1 MHz and on the other hand e.g. no more than 5 GHz for the electromagnetic signals transmitted therefrom.

Another aspect of the present invention relates to a method for localizing respective installation positions of a plurality of electronic wheel units of the type described herein, each of which is arranged on one of a plurality of vehicle wheels of a vehicle, the vehicle comprising:

detecting means arranged on the vehicle and associated with each one of the vehicle wheels (e.g. speed sensors of an ABS and/or ESP system), hereinafter referred to as fixed detecting means, for respectively detecting rotation angle positions of the relevant vehicle wheel that are present at certain detection times and transmission means (e.g. an interface to a digital bus system) for transmitting signals which include data representative of the rotation angle positions detected by the fixed detecting means and their associated detection times, the method comprising:

receiving and evaluating the signals transmitted by means of the electronic wheel units in order to determine the rotation angle positions detected by means of the (wheel-based) detecting means of the electronic wheel units and their associated detection times, receiving and evaluating the signals transmitted by means of the (vehicle-based) fixed detecting means of the vehicle in order to determine the rotation angle positions detected by means of the fixed detecting means and their associated detection times, comparing the rotation angle positions determined by means of the detecting means of the electronic wheel units and the rotation angle positions determined by means of the fixed detecting means of the vehicle by taking into account their respective detection times, in order to determine a correlation between the determined rotation angle positions, and analyzing the correlation in order to make an association between the electronic wheel units and the installation positions of the vehicle wheels.

According to a further aspect of the invention, an apparatus comprising means for carrying out such a localization method is proposed.

Such an apparatus may e.g. include a central control unit arranged in the vehicle, or may be formed by such, which is equipped with suitable interfaces for receiving the required signals and with the required computing capacity (e.g. by means of a microcontroller or the like).

According to a further aspect of the invention, there is provision for a computer program product comprising a program code which, when executed on a data processing device, carries out an operating method of an electronic wheel unit of the type described here and/or a localization method of the type described here.

BRIEF DESCRIPTION OF THE SEVERAL VIEWS OF THE DRAWING

The invention is described in more detail below on the basis of exemplary embodiments with reference to the enclosed drawings, in which.

DESCRIPTION OF THE INVENTION

Figure 1:
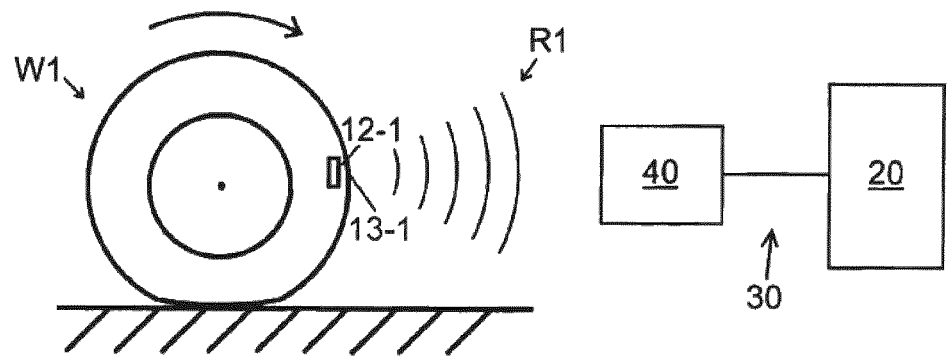
FIG. 1 shows a side view of a vehicle wheel equipped with an electronic wheel unit according to one exemplary embodiment.

FIG. 1 shows a vehicle wheel W1 on which an electronic wheel unit 12-1 is arranged, in the illustrated example on an inner side of a tire tread of the vehicle wheel W1 provided with an air-filled tire.

The primary purpose of the electronic wheel unit 12-1 is to measure a tire (inside) pressure "p" during operation of the relevant vehicle (see e.g. FIG. 4) and from time to time to transmit corresponding measurement results to a vehicle-based radio receiving unit 40, i.e. one arranged in the relevant vehicle, by means of an electromagnetic signal (radio signal) R1.

In the example shown, the radio receiving unit 40 has a communication connection via a digital bus system 30 to a central control unit 20 which evaluates data contained in each radio signal R1, in particular measured values of the tire pressure p in this case, and/or makes them available for further use in other parts of on-board electronics of the relevant vehicle.

The data of the signal R1 further contain an identification code of the wheel unit 12-1, so that each received signal from the control unit 20 can be unambiguously associated with this wheel unit 12-1.

When a plurality of vehicle wheels are equipped with such wheel units, however, there still remains the problem of associating the wheel unit identified on the basis of the data of a signal with the relevant installation position, i.e. the installation position (e.g. in the case of a car: front left, front right, rear left, rear right) of that vehicle wheel on which the wheel unit is actually arranged or installed.

For the purpose of such localization of each wheel unit, such as e.g. the wheel unit 12-1 shown, there is provision in the exemplary embodiment shown for the data of the signal R1 to further each represent a plurality of pieces of rotation angle position information which each indicate rotation angle positions of the vehicle wheel W1 that are detected by means of the wheel unit 12-1 and their associated detection times.

As a departure from this example, the data of the signal R1 could each also represent only a single piece of rotation angle position information (rotation angle position and associated detection time).

The control unit 20 compares the rotation angle position information of the relevant vehicle wheels that is detected in wheel-based fashion with rotation angle position information detected in vehicle-based fashion, so as to determine a correlation between the determined information and finally, by analyzing this correlation, to make an association between the individual wheel units and their installation positions.

Figure 2:
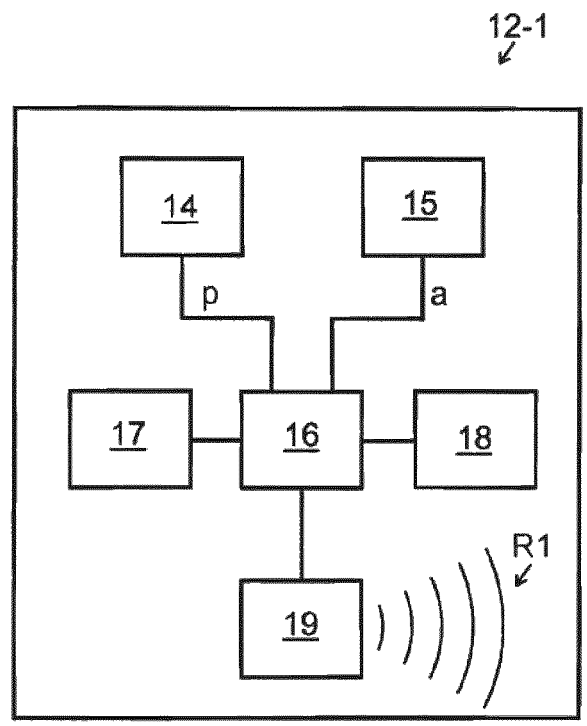
FIG. 2 shows a block diagram of the electronic wheel unit from FIG. 1.

FIG. 2 shows the design of the electronic wheel unit 12-1 in more detail.

The wheel unit 12-1 comprises a pressure sensor 14 for measuring the current tire pressure "p" and an acceleration sensor 15 for measuring a current radial acceleration "a".

A rotation of the vehicle wheel W1, symbolized by an arrow in FIG. 1, results in the acceleration sensor 15 measuring the radial acceleration a present at a site 13-1.

Since the radial acceleration a is made up of a component caused by the gravitation and a component caused by the rotation of the vehicle wheel W1, an appropriate evaluation of the sensor signal (e.g. by means of extraction of the gravitation component) can determine the current rotation angle position.

Moreover, a tire contact surface formed in the lower circumferential region of the wheel W1 results in corresponding signal characteristics in the sensor signal delivered by the acceleration sensor 15 whenever the wheel unit 12-1 or the site 13-1 passes through the region of this tire contact surface.

These signal characteristics, which arise periodically e.g. when traveling at constant speed, can therefore also be taken as a basis for determining when the site 13-1 passes through the tire contact surface and, by virtue of a further evaluation of the sensor signal, the current rotation angle position of the vehicle wheel W1 in a simple manner at any time.

As a departure from the use of an acceleration sensor, it would e.g. also be possible for what is known as a shock sensor or a deformation sensor or another suitable sensor to be used in order to realize detection of a rotation angle position at a certain detection time by means of evaluation of the sensor signal of said sensor.

In the wheel unit 12-1, the measured values representative of the tire pressure p and the acceleration a, as can be seen in FIG. 2, are communicated to a program-controlled evaluation device, in this case a microcontroller 16, which takes them as a basis for producing the data and communicates said data to a radio transmission unit 19 by means of which the signal R1 containing these data is transmitted. As already mentioned, the data in this case include a plurality of pieces of rotation angle position information.

A trait of the electronic wheel unit 12-1 is that a variable time difference between successive detection times of the rotation angle positions is provided. Specifically, in the example shown, this involves the electronic wheel unit 12-1 being used to detect an amount of longitudinal wheel acceleration of the vehicle wheel W1 and an interval of time between the detection times of the rotation angle positions tends to be set to be shorter the greater the amount of longitudinal wheel acceleration.

Alternatively or additionally, the electronic wheel unit 12-1 could also be used to detect an amount of transverse wheel acceleration of the vehicle wheel W1 and the interval of time between the detection times of the rotation angle positions could tend to be set to be shorter the greater the amount of longitudinal wheel acceleration.

Further, there could additionally also be provision for the interval of time between the detection times to be dependent on the rotation angle velocity of the vehicle wheel W1.

The detection of the longitudinal wheel acceleration and the rotation angle velocity of the vehicle wheel W1 can be accomplished by means of the microcontroller 16 by virtue of appropriate evaluation of the sensor signal delivered by the acceleration sensor 15.

If the aim is (also) for transverse wheel acceleration to be detected, it is advisable either to suitably design the acceleration sensor 15 contained in the electronic wheel unit 12-1 for measuring transverse acceleration (also) or to integrate a separate acceleration sensor (not shown) for measuring transverse acceleration into the electronic wheel unit 12-1.

In respect of setting the detection times, the microcontroller 16 in the example shown is connected to a clock 17 contained in the wheel unit 12-1 for the purpose of timekeeping. Alternatively, such a clock 17 could e.g. also be implemented as a partial functionality of the microcontroller 16 by the latter itself.

In the example shown, one or more detected rotation angle positions are initially accumulated by buffer-storing the corresponding rotation angle position information in a memory unit 18, connected to the microcontroller 16, that e.g. can also store a program code for sequence control for the microcontroller 16.

At predetermined transmission times (e.g. periodically), the microcontroller 16 initiates the transmission of a signal R1 containing the corresponding data. In each case, the data contain the rotation angle position information acquired and buffer-stored since the last transmission.

The individual detection times (based on the operation of the wheel-based clock 17) can be encoded within the data of the relevant signal R1 e.g. by appropriate time information ("timestamps"), so that this time information can be decoded again at the receiver and used in the localization method.

As a departure from the example shown, in which the data in each case explicitly indicate detection times and associated rotation angle positions, it would also be possible for the data transmitted using the signal R1 to explicitly indicate the detection times only, whereas the associated rotation angle positions are implicitly represented by the data by virtue of said data e.g. being fixed. By way of example, there could be provision for all detections to always take place at one and the same fixed rotation angle position.

In the example shown, the signal R1, which contains data relating to rotation angle position information acquired previously (since the last signal transmission), is transmitted again after every 10 s.

Figure 3:
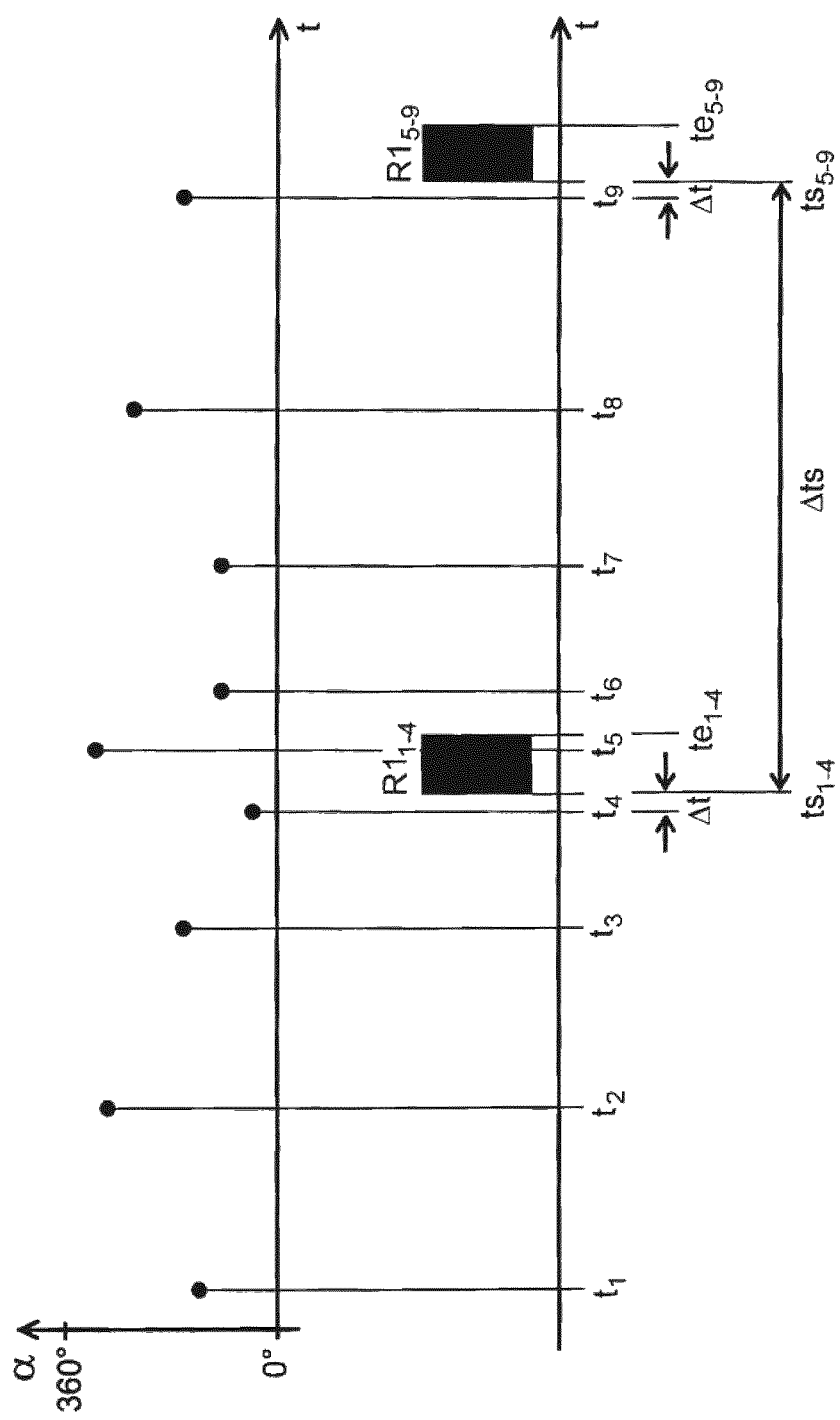
FIG. 3 is a graph illustrating a detection of rotation angle positions of the vehicle wheel from FIG. 1 and the transmission of a sequence of radio signals over time on the basis thereof.

FIG. 3 illustrates this operation of the wheel unit 12-1 by way of example.

FIG. 3 is a timing diagram, the upper part of which shows rotation angle positions $\sigma_i$, detected at discrete times, that are denoted by dots and have been detected at associated detection times $t_i$. The index "i" in this case denotes a serial number for the corresponding detection (measurement). FIG. 3 shows the measurements for i=1, 2, 3, . . . 7, 8, 9.

In this case, each rotation angle position $\sigma_i$ can assume values in a range from 0° to 360° (corresponding to one full revolution of the vehicle wheel W1). The value of 0°, equivalent to a value of 360° on the basis of the periodicity, can be associated, according to any convention, with a specific rotational position of the wheel W1, for example a position at which the site 14-1 (see FIG. 1) of the electronic wheel unit 12-1 is at the very top (or alternatively e.g. at the very bottom).

As can be seen from FIG. 3, the measurements of the rotation angle position σ are performed at variable intervals of time ($t_2-t_1$, $t_3-t_2$, $t_4-t_3$, . . . ) over time t. In the example shown, the interval between the times $t_1, t_2, t_3, \ldots$ is always in the range from 0.2 s to 10 s and, as mentioned, tends to be set to be shorter the greater the amount of aforementioned (current) wheel acceleration, in this case e.g. longitudinal wheel acceleration.

In the example shown, this could involve e.g. a value of the longitudinal wheel acceleration below a first threshold value resulting in the interval of time ($t_{i+1}-t_i$) between successive detections being set at 10 s and a value of the longitudinal wheel acceleration above a second threshold value resulting in said interval of time being set at 0.2 s, there possibly being provision for e.g. a linear dependence (decrease in the interval of time as longitudinal wheel acceleration increases) for the intermediate range (first threshold value longitudinal wheel acceleration second threshold value) in the simplest case. However, the latter dependence could also be provided for differently and/or be modified by further dependences (e.g. on the transverse wheel acceleration and/or the wheel rotation angle velocity).

The variation of the intervals of time $t_{i+1}-t_i$ that is apparent by way of example from FIG. 3 could therefore be based e.g. on the scenario that in the period from approximately $t_1$ to $t_5$ the driver increasingly accelerates (or brakes) the vehicle and in the period from approximately $t_6$ to $t_9$ he reduces this acceleration (or braking) again, so that relatively quickly successive detections of the rotation angle positions ($\sigma_4$ to $\sigma_6$) are effected in the period from approximately $t_4$ to $t_6$.

As is further apparent from FIG. 3, the rotation angle positions $\sigma_1$ to $\sigma_4$ collected up to a certain transmission time are picked up, together with their associated detection times $t_1$ to $t_4$, from the electronic wheel unit 12-1 in data, which are transmitted to the radio receiving unit 40 using a radio signal R1$_{1-4}$.

The rotation angle positions $\sigma_5$ to $\sigma_9$ which are then collected in the same way are picked up together with their associated detection times $t_5$ to $t_9$ by the electronic wheel unit 12-1 in data, which are transmitted to the radio receiving unit 40 using a subsequent radio signal R1$_{5-9}$.

A start time ts of each signal R1, as shown in FIG. 3 a start time ts$_{1-4}$ of the signal R1$_{1-4}$ and a start time ts$_{5-9}$ of the signal R1$_{5-9}$, is correlated in a predetermined manner with the data included by the relevant signal R1 in the example shown. This correlation consists in a time difference $\Delta t$ between the last of the detection times contained in the data in each case (in this instance e.g. the times $t_4$ and $t_9$) and the start time ts of the relevant signal (in this instance ts$_{1-4}$ or ts$_{5-9}$) being fixed. This time difference $\Delta t$ is e.g. approximately 0.4 s in the example shown.

In addition, there is provision in the example shown for the start times ts of successive signals R1, in this case that is to say e.g. the start times ts$_{1-4}$ and ts$_{5-9}$, to be periodically successive with a predetermined time difference $\Delta$ts. In the example shown, this time difference $\Delta$ts=15 s.

After the signals R1 are received by the radio receiving unit 40 and the data contained therein are supplied to the central control unit 20, which has its own vehicle-based clock, an evaluation of the data involves the detection times $t_i$ determined directly from the received data (and referenced to the wheel-based clock in the wheel unit 12-1) being converted into detection times $t_1^*$ which are referenced to the operation of the vehicle-based clock.

Such clock synchronization between the wheel-based clock 17 and the vehicle-based clock can be realized on the vehicle e.g. by virtue of the time difference $\Delta$ts between successive start times (in this instance e.g. between the times ts$_{1-4}$ and ts$_{5-9}$) being measured by means of the vehicle-based clock and compared with the setting $\Delta$ts=15 s, with a (typically occurring small) disparity between the nominal value of 15 s and the time difference actually measured at the vehicle then being able to be taken as a basis for establishing the operating speed difference between the wheel-based clock 17 in the wheel unit 12-1 and the vehicle-based clock.

Assuming that the vehicle-based measurement of the time difference $\Delta$ts=15 s results in a period of $\Delta$ts*=14.8 s referenced to the vehicle-based clock, this means that the wheel-based clock 17 is running too fast by a factor of $\Delta$ts/$\Delta$ts*=15 s/14.8 s=1.014.

Based on the conversion factor thus calculated, in this instance 1.014, it is then possible for e.g. the "real" time $t_4^*$ (referenced to the vehicle-based clock) to be calculated as the time ts$_{1-4}^*$ measured at the vehicle less 1.014×0.4 s.

Finally, it is then possible for e.g. the remaining detection times $t_1$ to $t_3$ to be calculated e.g. on the basis of the corresponding time differences $t_4-t_1$, $t_4-t_2$ and $t_4-t_3$ likewise corrected by the factor 1.014. The time $t_1^*$ referenced to the vehicle-based clock is thus obtained e.g. as: $t_1^*=t_4^*-1.014\times(t_4-t_1)$.

Such clock synchronization can be carried out continuously or from time to time (update of the conversion factor).

The clock synchronization explained above using the example of the wheel unit 12-1 of the vehicle wheel W1 can be performed in a corresponding manner for the wheel units installed on one or more further vehicle wheels of the same vehicle.

Based on the detection times thus referenced to the common vehicle-based clock for all vehicle wheels, it is then possible for a localization method to be performed to associate each electronic wheel unit with the correct installation position in each case.

Since the intervals of time between the detection times $t_1$, $t_2$, $t_3$ . . . are provided for variably in each case, depending on a current amount of wheel acceleration (and possibly e.g. additionally depending on a current rotation angle velocity) of the relevant vehicle wheel), the electronic wheel unit can advantageously be used to obtain and transmit particularly meaningful rotation angle position information.

The arrangement of a plurality of electronic wheel units on a corresponding plurality of vehicle wheels and a localization method carried out in this case are explained below with reference to FIGS. 4 and 5.

Figure 4:
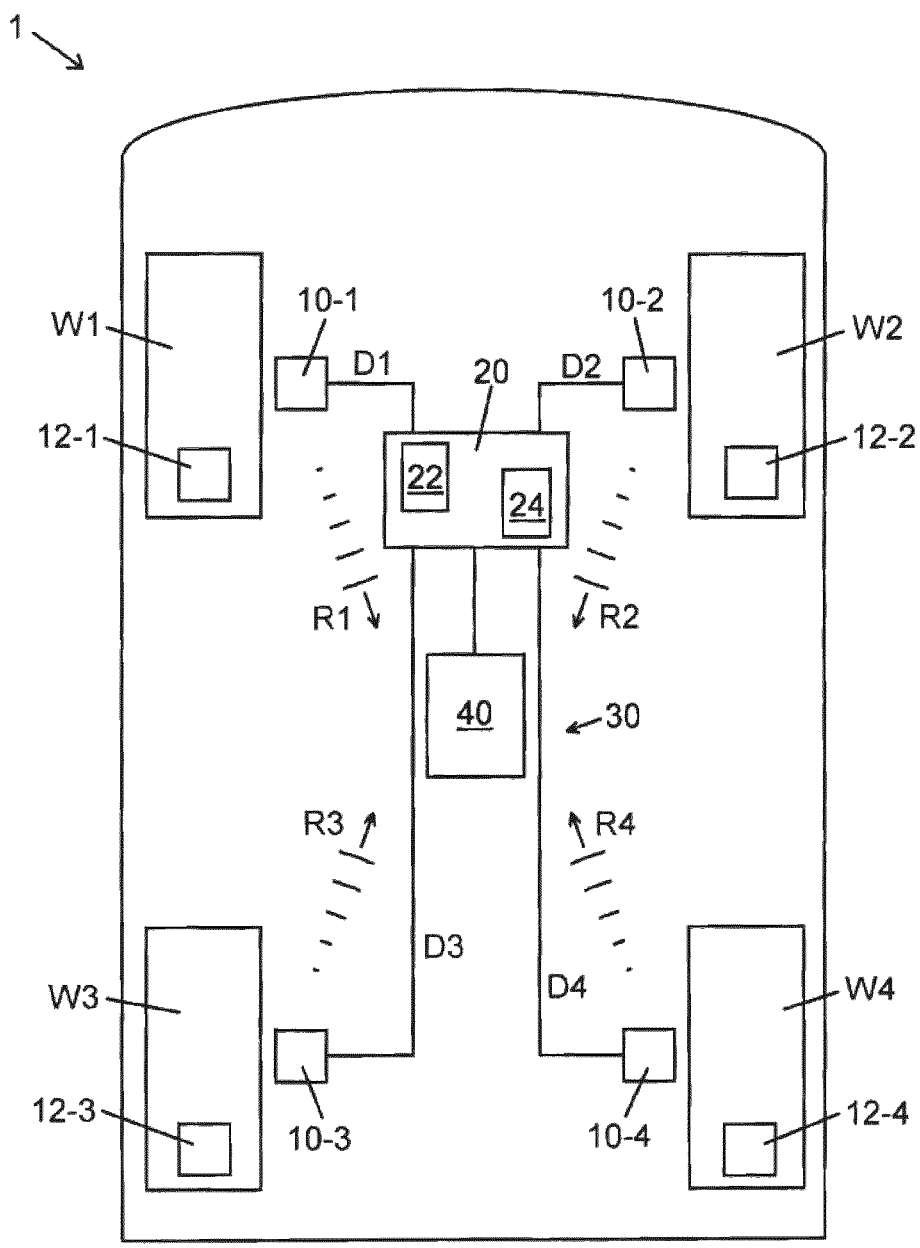
FIG. 4 is a schematic plan view of a motor vehicle which is equipped with a tire pressure monitoring system and in this regard has vehicle wheels of the type shown in FIGS. 1 and 2 equipped with electronic wheel units.

FIG. 4 shows a motor vehicle 1, in this instance e.g. a car, in which four vehicle wheels W1 to W4 are arranged at installation positions "front left", "front right", "rear left" and "rear right".

In this example, it will be assumed that the vehicle wheel W1 together with the electronic wheel unit 12-1 is the vehicle wheel already described with reference to FIGS. 1 to 3 and that the further vehicle wheels W2 to W4 together with their electronic wheel units 12-2 to 12-4 are of respectively corresponding design, so that a detailed description of the wheels W1 to W4 together with their wheel units 12-1 to 12-4 will be dispensed with at this juncture.

The radio signals transmitted by the wheel units 12-1 to 12-4 (e.g. all periodically) are denoted by R1 to R4 in FIG. 4.

The radio receiving unit 40 transmits the data received by means of these signals R1-R4 to the central control unit 20 via the digital bus system 30 (e.g. LIN bus system or the like), which central control unit is equipped with a computer unit 22 and a digital memory unit 24 for the purpose of evaluating the data (concerning tire pressures and rotation angle positions) of the vehicle wheels W1-W4. In this case, the memory unit 24 contains in particular a program code for sequence control of the evaluation in the control unit 20.

The vehicle 1 has provision for vehicle-based rotation speed sensors 10-1 to 10-4, each of which is associated with one of the vehicle wheels W1-W4 as shown, that can be used to perform time-resolved detection of the rotation angle positions of the individual vehicle wheels W1 to W4.

Based on the speed sensors 10-1 to 10-4, corresponding data (i.e. rotation angle positions together with their associated detection times) D1-D4 are transmitted to the central control unit 20 via the digital bus system 30.

The localization method carried out in the control unit 20 comprises the following steps:

receiving and evaluating the signals R1-R4 transmitted by means of the electronic wheel units 12-1 to 12-4 in order to determine the rotation angle positions $\sigma_i$ detected by means of the respective wheel-based detecting means 15, 16, 17, 18 of the electronic wheel units 12-1 to 12-4 and their associated detection times $t_i$, receiving and evaluating the signals D1-D4 transmitted by means of the vehicle-based speed sensors 10-1 to 10-4 of the vehicle 1 in order to determine the rotation angle positions detected by means of the speed sensors 10-1 to 10-4 and their associated detection times, comparing the rotation angle positions determined by means of the electronic wheel units 12-1 to 12-4 and the rotation angle positions determined by means of the speed sensors 10-1 to 10-4 of the vehicle 1 by taking account of their respective detection times, in order to determine a correlation between the determined rotation angle positions, and analyzing the correlation in order to make an association between the electronic wheel units 12-1 to 12-4 and the installation positions (in this case: "front left", "front right", "rear left" and "rear right") of the vehicle wheels W1-W4.

Figure 5:
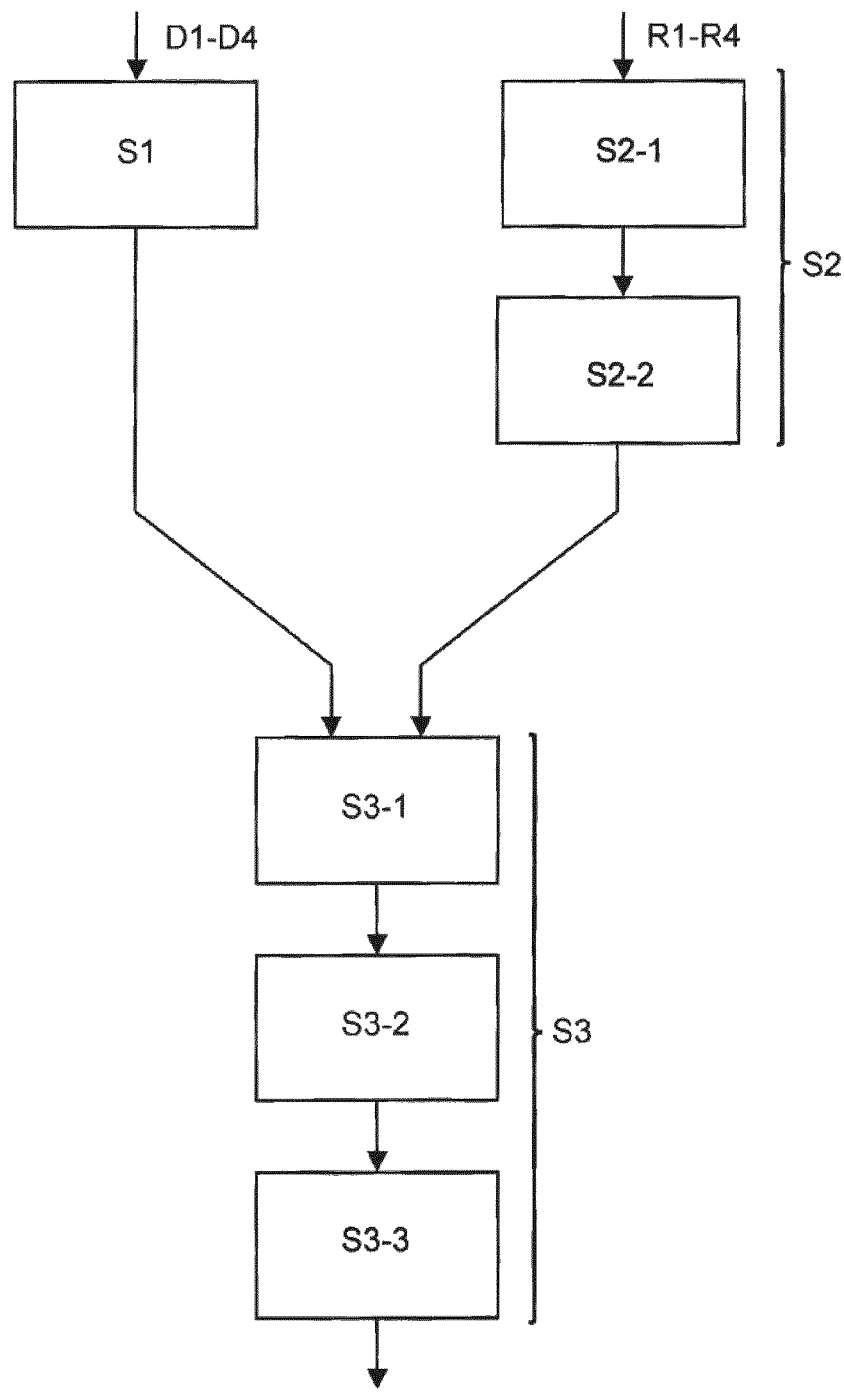
FIG. 5 is a flowchart illustrating a localization method performed in the vehicle from FIG. 4.

FIG. 5 shows essential steps of this localization method again in a flowchart.

In a step S1, the receiving and evaluating of the signals D1-D4 transmitted by means of the vehicle-based speed sensors 10-1 to 10-4 is effected.

In a step S2, the receiving and evaluating of the signals R1-R4 transmitted by means of the wheel-based electronic wheel units 12-1 to 12-4 is effected, this step S2 consisting of two substeps S2-1 and S2-2.

In substep S2-1, the rotation angle positions contained in the received data are extracted, together with their associated detection times.

In substep S2-2, vehicle-based measuring of at least one time and/or of a time difference in consideration of the received signal and converting of these detection times into detection times referenced to a vehicle-based clock are effected.

Finally, in a step S3 composed of substeps S3-1, S3-2 and S3-3, the actual algorithm for localizing the installation positions of the wheel units 12-1 to 12-4 is performed.

In substep S3-1, for each of the wheel units or for each of their identification codes, the rotation angle positions determined by means of the wheel units and the rotation angle positions determined by means of the vehicle-based fixed detecting means are subjected to a comparison taking into consideration their respective detection times. In this case, it is possible for e.g. a plurality of distribution patterns corresponding to the number of vehicle wheels considered to be determined which show e.g. for each identification code how greatly rotation angle position information determined for the relevant identification code in wheel-based fashion differs from each of the pieces of rotation angle position information determined in vehicle-based fashion.

In substep S3-2, a result of the comparison is taken as a basis for determining, e.g. separately for each identification code, a correlation between the rotation angle position information determined on the one hand in wheel-based fashion and on the other hand in vehicle-based fashion. For this purpose, it is possible for e.g. predetermined correlation parameters to be calculated, e.g. parameters which are characteristic of the probability of a particular wheel unit or its identification code being associated with a particular installation position.

Finally, in substep S3-3, the correlation(s) is/are analyzed to make an association between the wheel units and the installation positions. In this case, it is possible for the association e.g. to be based on the statistically most likely installation position in each case being associated for each wheel unit or its identification code and/or vice versa the statistically most likely wheel unit being associated for each installation position.

LIST OF REFERENCE SIGNS

1 motor vehicle
W1 to W4 vehicle wheels
10-1 to 10-4 speed sensors
D1 to D4 signals of the speed sensors
12-1 to 12-4 electronic wheel units
13-1 site
14 pressure sensor
15 acceleration sensor
16 evaluation device (microcontroller)
17 wheel-based clock
18 memory unit
19 radio transmission unit
R1 to R4 signals of the electronic wheel units
20 central control unit
22 computer unit
24 memory unit
30 digital bus system
40 radio receiving unit
t time
σ rotation angle
$t_1, t_2, t_3, \ldots$ detection times
Δt time difference
ts start time
te end time
Δts time difference

The invention claimed is:

1. A method for operating an electronic wheel unit disposed on a vehicle wheel of a vehicle, the method comprising the following steps:
    using a detector for detecting rotation angle positions of the vehicle wheel being present at certain detection times;
    using a radio transmitter for transmitting a sequence of individual electromagnetic signals including data representative of the detected rotation angle positions and their associated detection times;
    additionally using the detector to detect an amount of a wheel acceleration of the vehicle wheel; and
    setting an interval of time between the detection times of the rotation angle positions by the detector to be shorter with a greater amount of wheel acceleration.

2. The method according to claim 1, which further comprises taking into account at least one of a longitudinal wheel acceleration or a transverse wheel acceleration for the amount of wheel acceleration.

3. The method according to claim 1, which further comprises periodically detecting the amount of wheel acceleration.

4. The method according to claim 1, which further comprises detecting the amount of wheel acceleration at times being set variably by the detector.

5. The method according to claim 1, which further comprises providing each of the signals with data representing at least three of the detected rotation angle positions and their associated detection times.

6. The method according to claim 1, which further comprises selecting a number of the rotation angle positions represented by the data of a signal, together with associated detection times, as a function of a current rotation angle velocity of a relevant vehicle wheel.

7. An electronic wheel unit for placement on a vehicle wheel of a vehicle, the electronic wheel unit comprising:
   a detector for detecting rotation angle positions of the vehicle wheel being present at certain detection times; and
   a radio transmitter for transmitting a sequence of individual electromagnetic signals including data representative of the detected rotation angle positions and their associated detection times;
   said detector being configured to detect an amount of a wheel acceleration and to set an interval of time between the detection times of the rotation angle positions to be shorter with a greater amount of wheel acceleration.

8. A method for localizing respective installation positions of a plurality of electronic wheel units each being disposed on one of a plurality of vehicle wheels of a vehicle, the method comprising the following steps:
   using detectors for detecting rotation angle positions of the vehicle wheels being present at certain detection times;
   using radio transmitters for transmitting a sequence of individual electromagnetic signals including data representative of the detected rotation angle positions and their associated detection times;
   additionally using the detectors to detect an amount of a wheel acceleration of the vehicle wheels;
   setting an interval of time between the detection times of the rotation angle positions by the detectors to be shorter with a greater amount of wheel acceleration;
   providing the vehicle with fixed detectors each being disposed on the vehicle and associated with a respective one of the vehicle wheels for detecting rotation angle positions of a respective relevant vehicle wheel being present at certain detection times;
   providing the vehicle with a transmitter for transmitting signals including data representative of the rotation angle positions detected by the fixed detectors and their associated detection times;
   receiving and evaluating the signals transmitted by the electronic wheel units to determine rotation angle positions detected by said detectors of the electronic wheel units and their associated detection times;
   receiving and evaluating the signals transmitted by the fixed detectors of the vehicle to determine the rotation angle positions detected by the fixed detectors and their associated detection times;
   comparing the rotation angle positions determined by the detectors of the electronic wheel units and the rotation angle positions determined by the fixed detectors of the vehicle by taking into account their respective detection times, to determine a correlation between the determined rotation angle positions; and
   analyzing the correlation to make an association between the electronic wheel units and installation positions of the vehicle wheels.

9. An apparatus for localizing respective installation positions of a plurality of electronic wheel units each being disposed on one of a plurality of vehicle wheels of a vehicle, the apparatus comprising:
   detectors disposed at the electronic wheel units for detecting rotation angle positions of the vehicle wheels being present at certain detection times;
   radio transmitters for transmitting a sequence of individual electromagnetic signals including data representative of the detected rotation angle positions and their associated detection times;
   said detectors being configured to detect an amount of a wheel acceleration and to set an interval of time between the detection times of the rotation angle positions to be shorter with a greater amount of wheel acceleration;
   fixed detectors each being disposed on the vehicle and associated with a respective one of the vehicle wheels for detecting rotation angle positions of a respective relevant vehicle wheel being present at certain detection times;
   a transmitter disposed on the vehicle for transmitting signals including data representative of the rotation angle positions detected by said fixed detectors and their associated detection times; and
   a central control unit and a radio receiving unit for:
      receiving and evaluating signals transmitted by the electronic wheel units to determine the rotation angle positions detected by said detectors of the electronic wheel units and their associated detection times;
      receiving and evaluating the signals transmitted by said fixed detectors of the vehicle to determine the rotation angle positions detected by said fixed detectors and their associated detection times;
      comparing the rotation angle positions determined by said detectors of the electronic wheel units and the rotation angle positions determined by said fixed detectors of the vehicle by taking into account their respective detection times, to determine a correlation between the determined rotation angle positions; and
      analyzing the correlation to make an association between the electronic wheel units and installation positions of the vehicle wheels.

10. A non-transitory computer-readable medium with instructions stored thereon, that when executed by a processor, perform the steps of the method according to claim 1.

* * * * *